(12) United States Patent
Mahajan et al.

(10) Patent No.: US 12,301,761 B1
(45) Date of Patent: May 13, 2025

(54) INTELLIGENT ROUTING SIGNALING SYSTEM

(71) Applicant: Bank of America Corporation, Charlotte, NC (US)

(72) Inventors: Nipun Mahajan, Lawrenceville, NJ (US); Amit Mishra, Chennai (IN); Yogesh Raghuvanshi, Pennington, NJ (US); S. B. Pravin Kumar, Nagercoil (IN); Balaji Sugumar, Chennai (IN); Yaksh Kumar Singh, Uttar Pradesh (IN)

(73) Assignee: Bank of America Corporation, Charlotte, NC (US)

( * ) Notice: Subject to any disclaimer, the term of this patent is extended or adjusted under 35 U.S.C. 154(b) by 13 days.

(21) Appl. No.: 18/387,970

(22) Filed: Nov. 8, 2023

(51) Int. Cl.
H04M 3/523 (2006.01)
H04M 3/51 (2006.01)

(52) U.S. Cl.
CPC ....... H04M 3/5235 (2013.01); H04M 3/5233 (2013.01)

(58) Field of Classification Search
CPC ...... H04M 3/51; H04M 3/523; H04M 3/5233; H04M 3/5235
USPC ............................ 379/265.01–265.08, 265.13
See application file for complete search history.

(56) References Cited

U.S. PATENT DOCUMENTS

| | | | |
|---|---|---|---|
| 7,321,298 B2 | 1/2008 | Judkins et al. | |
| 7,469,047 B2 | 12/2008 | Judkins et al. | |
| 7,894,595 B1 | 2/2011 | Wu et al. | |
| 8,583,466 B2 | 11/2013 | Margulies et al. | |
| 8,724,795 B1 * | 5/2014 | Aldrich | H04M 3/51 379/265.02 |
| 8,831,207 B1 * | 9/2014 | Agarwal | H04M 3/5232 379/265.09 |
| 8,885,812 B2 | 11/2014 | Margulies et al. | |
| 9,521,259 B2 | 12/2016 | Davis et al. | |
| 9,584,578 B2 | 2/2017 | Amalapurapu et al. | |
| 10,003,621 B2 | 6/2018 | Fedorov | |
| 10,673,909 B2 | 6/2020 | Sanche | |
| 10,841,424 B1 * | 11/2020 | Lemus | H04M 3/5175 |
| 11,418,652 B1 * | 8/2022 | Tron | G06N 20/00 |
| 2008/0003964 A1 * | 1/2008 | Alperin | H04M 3/5233 455/185.1 |
| 2015/0256675 A1 * | 9/2015 | Sri | H04M 3/5183 379/265.09 |
| 2018/0159978 A1 * | 6/2018 | Gupta | H04M 3/5141 |
| 2018/0167505 A1 * | 6/2018 | Bird | H04M 3/5175 |

* cited by examiner

*Primary Examiner* — Harry S Hong
(74) *Attorney, Agent, or Firm* — Banner & Witcoff, Ltd.

(57) ABSTRACT

Arrangements for intelligent call routing are provided. Audio data from a call between an agent device and a user device may be received and a topic of the call and metadata may be extracted from the audio data. The extracted topic and metadata may be compared to an alert signals database to output whether an alert will be attached to the call. Agent parameters associated with the agent who is part of the call may be identified. A machine learning model may be executed by inputting, to the model, the extracted topic, extracted metadata, the output of whether the alert will be attached to the call, and the agent parameters, to output a routing signal. Based on the routing signal, a second call communication session may be initiated between the agent computing device and a computing device of at least one of another agent or a supervisor.

20 Claims, 13 Drawing Sheets

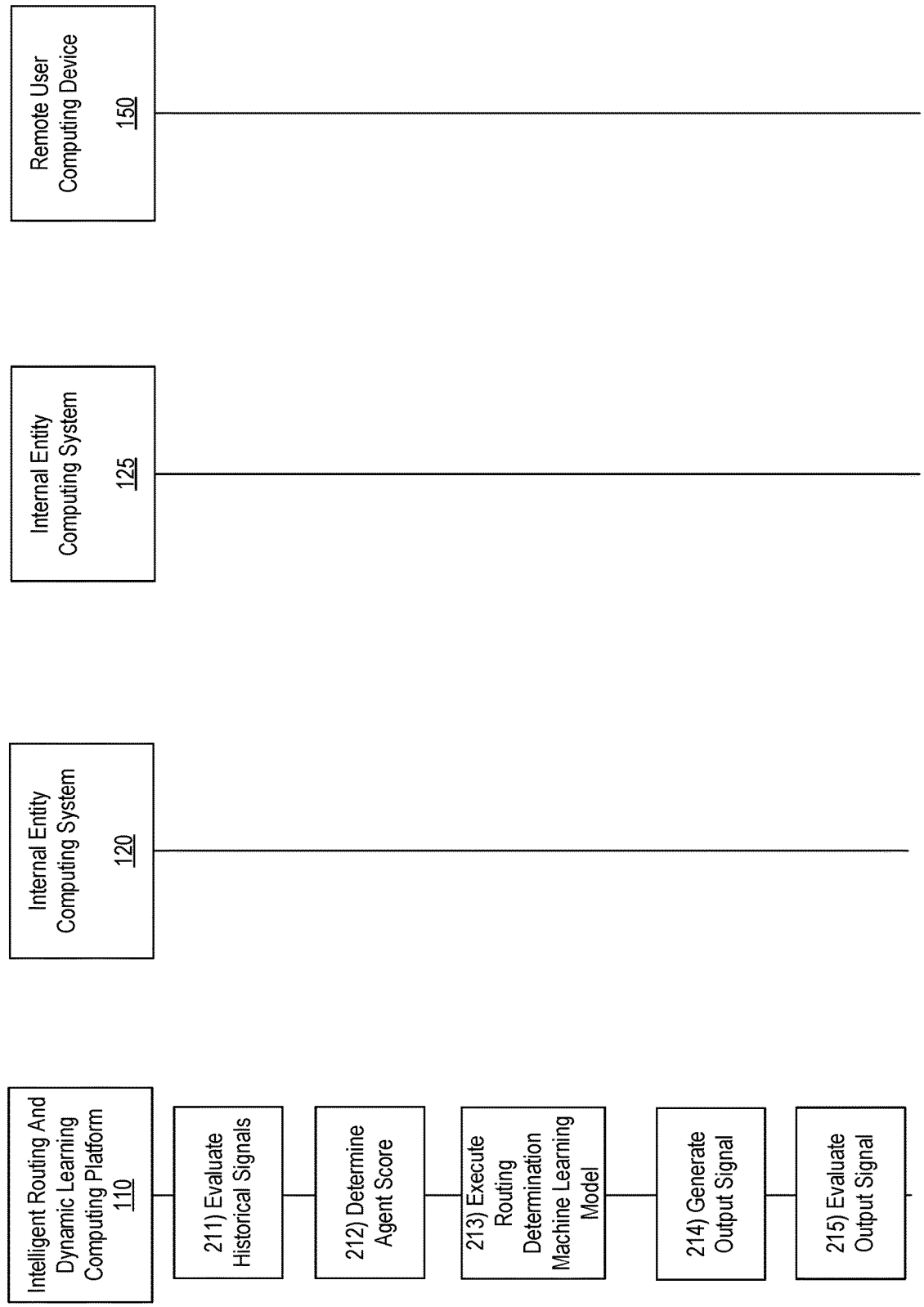

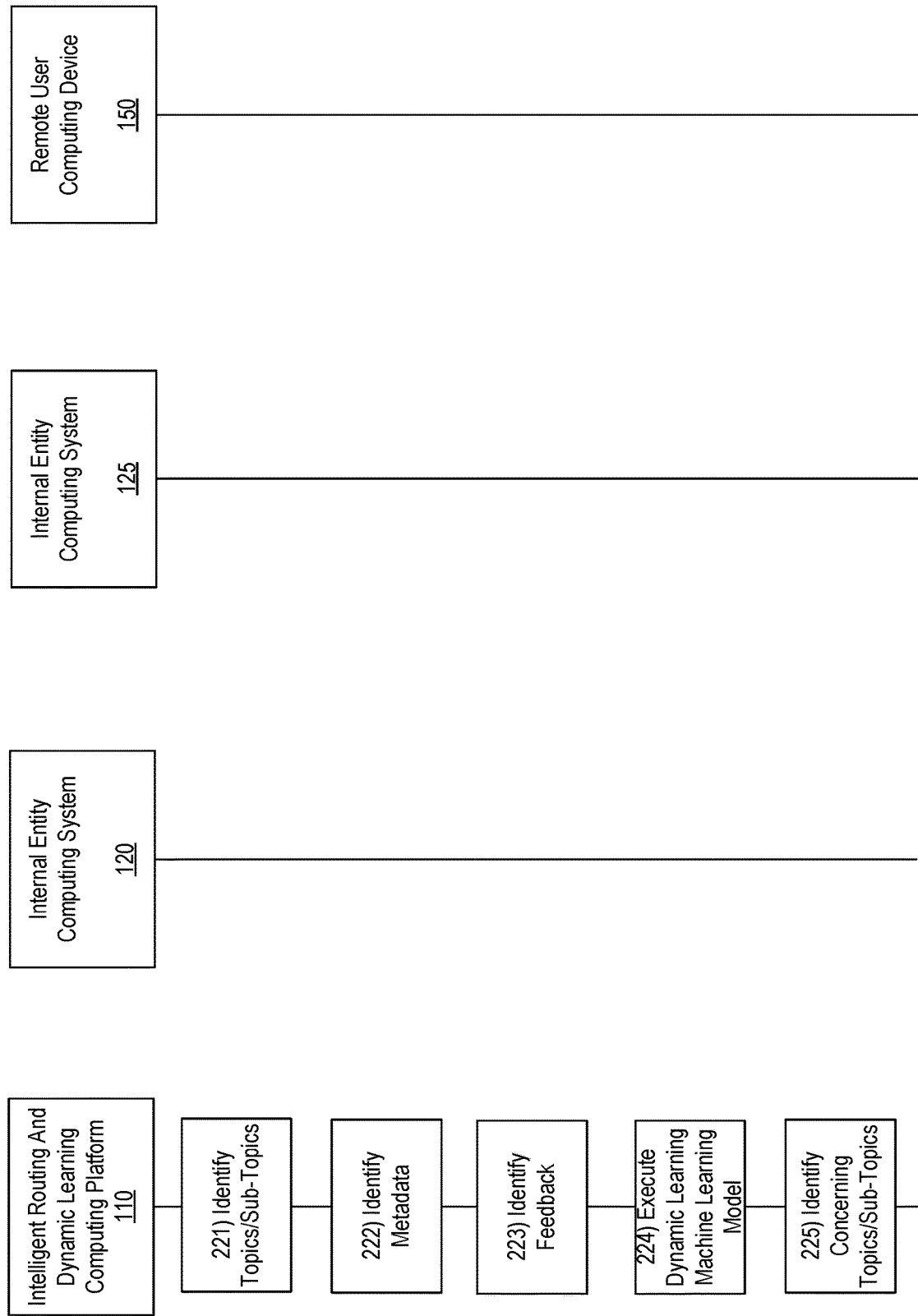

500

NOTICE!

You Have Been Selected For Dynamic Learning on Topic

Subject 1

Please Select *Join* Below To Join The Session

Cancel

*Join*

FIG. 5

INTELLIGENT ROUTING SIGNALING SYSTEM

BACKGROUND

Aspects of the disclosure relate to electrical computers, systems, and devices for intelligent routing signaling.

Conventional call centers rely on agents having various skills and proficiency levels to address a variety of customer issues. In some instances, a particular agent might not be skilled or proficient in a particular topic or subject matter. This may lead a call to be longer than expected and may lead to customer dissatisfaction. Further, customers might not be aware of a process to request a different agent or escalate the issue to a supervisor. Accordingly, aspects described herein intelligently route calls to alternate agents or supervisors based on machine learning analysis of a current call or communication session.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with intelligently routing calls or communication sessions to additional agents or supervisors.

In some examples, audio data from a communication session between an agent device and a user device may be received. A topic of the communication session may be extracted from the audio data. In some examples, metadata and signal data identifying parameters of the communication session may be extracted from the audio data. The extracted topic of the communication session and the metadata and signal data may be compared to an alert signals database to output whether an alert will be attached to the communication session.

In some arrangements, agent parameters associated with the agent who is part of the communication session may be identified. A routing determination machine learning model may be executed. In some examples, executing the routing determination machine learning model may include inputting, to the model, the extracted topic of the communication session, extracted metadata and signal data identifying parameters of the communication session, the output of whether the alert will be attached to the communication session, and the agent parameters, to output a routing signal. Based on the routing signal, a second communication session may be initiated between the agent computing device and a computing device of at least one of another agent or a supervisor.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2G depict an illustrative event sequence for intelligent routing and dynamic learning in accordance with one or more aspects described herein;

FIG. 5 illustrates an example graphical user interface that may be generated in accordance with one or more aspects described herein.

DETAILED DESCRIPTION

Figure 1A:
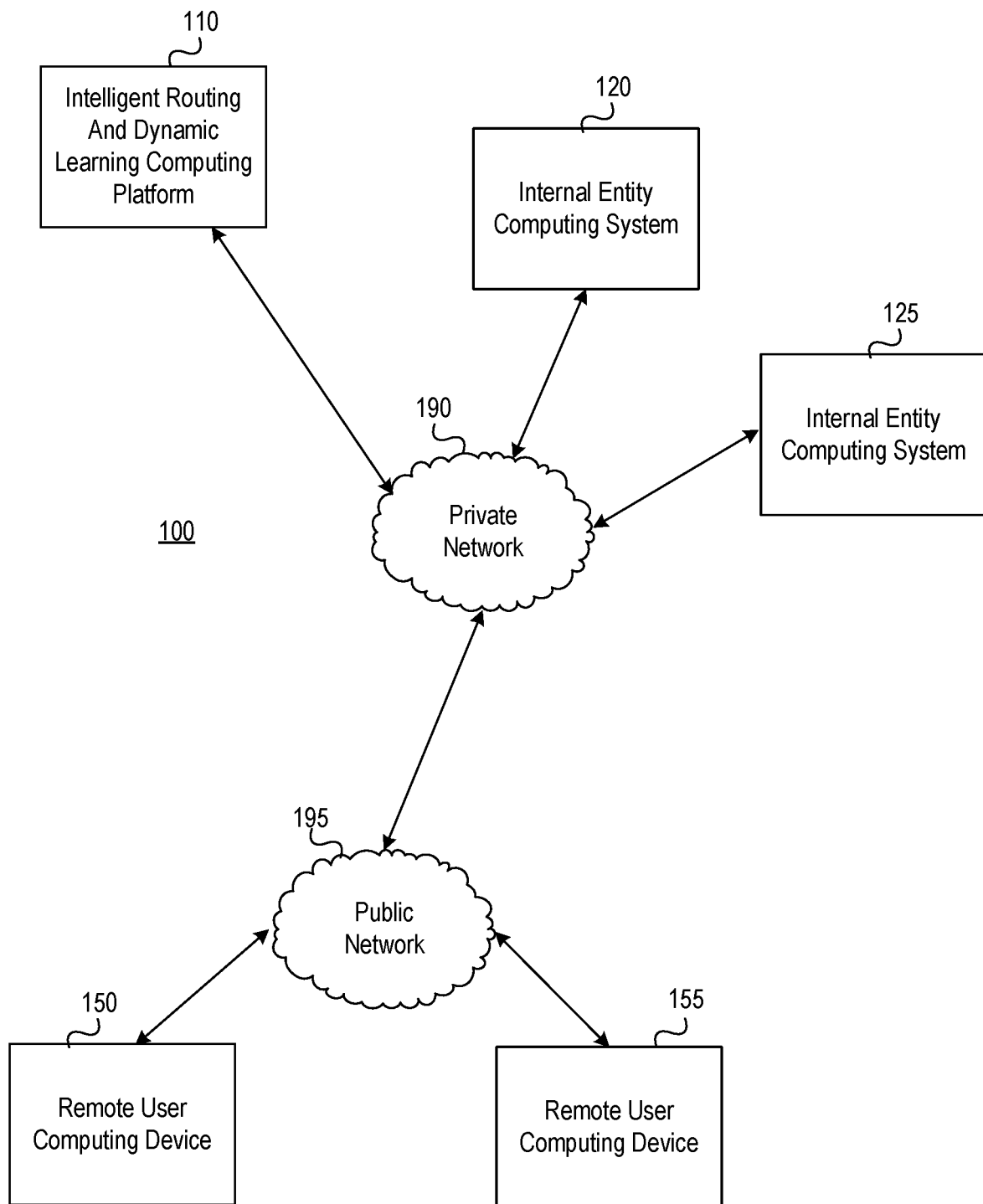
FIGS. 1A-1B depict an illustrative computing environment for intelligent routing and dynamic learning in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, effectively identifying opportunities for call routing and automatically routing calls (e.g., calls between customer service agents of an enterprise organization and a customer) may be integral to providing efficient service for an enterprise organization. For instance, in conventional systems in which an agent is communicating with a user or customer, if the agent can resolve the customer's issue, the customer may become frustrated, the call may go on too long and the customer might not know how to escalate the call to get resolution. This can lead to unhappy customers and additional costs for the enterprise organization because calls may go on longer than they would if the agent was able to resolve or escalate the issue.

Further, the ability to identify topics in which training is needed and efficiently identify agents and engage them in dynamic learning sessions may be and effective tool for improving knowledge and skills of agents. Accordingly, aspects described herein provide for machine learning-based intelligent routing and dynamic learning. For instance, the arrangements described herein use machine learning to identify, in real-time, scenarios in which a call should be escalated to a supervisor, agents needing training should be added to an ongoing call to dynamically train the agents, and the like.

For instance, audio data from a communication session may be received and analyzed, in real-time, to identify a topic of the call or communication session. In some examples, natural language processing may be used to analyze the audio data and identify the topic. In some examples, metadata may be extracted from the audio data to identify call parameters, such as periods of silence, a reference to a previous call, a duration of the call, or the like. The topic and metadata may be compared to data stored in an alert signals database to determine whether an alert should be attached to the call being analyzed.

In some examples, a routing determination machine learning model may be executed using, as inputs, the topic, metadata, alert output and, in some examples, agent parameters. The routing determination machine learning model may output a routing signal which may then be executed to join another agent to the call, transfer the call to a supervisor, or the like.

Further, machine learning may be used to analyze a plurality of communication sessions. For instance, audio data from a plurality of communication sessions may be received and topics or sub-topics of each communication session may be identified. Metadata identifying call parameters may be extracted and feedback data may be received. In some examples, a dynamic learning machine learning model may be executed using the topics and/or sup-topics, metadata, feedback data and, in some examples, outputs from the routing determination machine learning model, as inputs to output one or more identified topics or sub-topics of concern.

In some arrangements, the system may then monitor a plurality of ongoing communication sessions to identify an ongoing communication session related to a topic or sub-topic of concern. Based on agent mapping data, a first plurality of agents who are not subject matter experts in the topic or sub-topic of concern may be identified and a second plurality of agents who have an available status may be identified from the first plurality of agents who are not subject matter experts. The second plurality of agents may then be joined to the ongoing communication session in a dynamic learning session.

These and various other arrangements will be discussed more fully below.

Figure 1B:
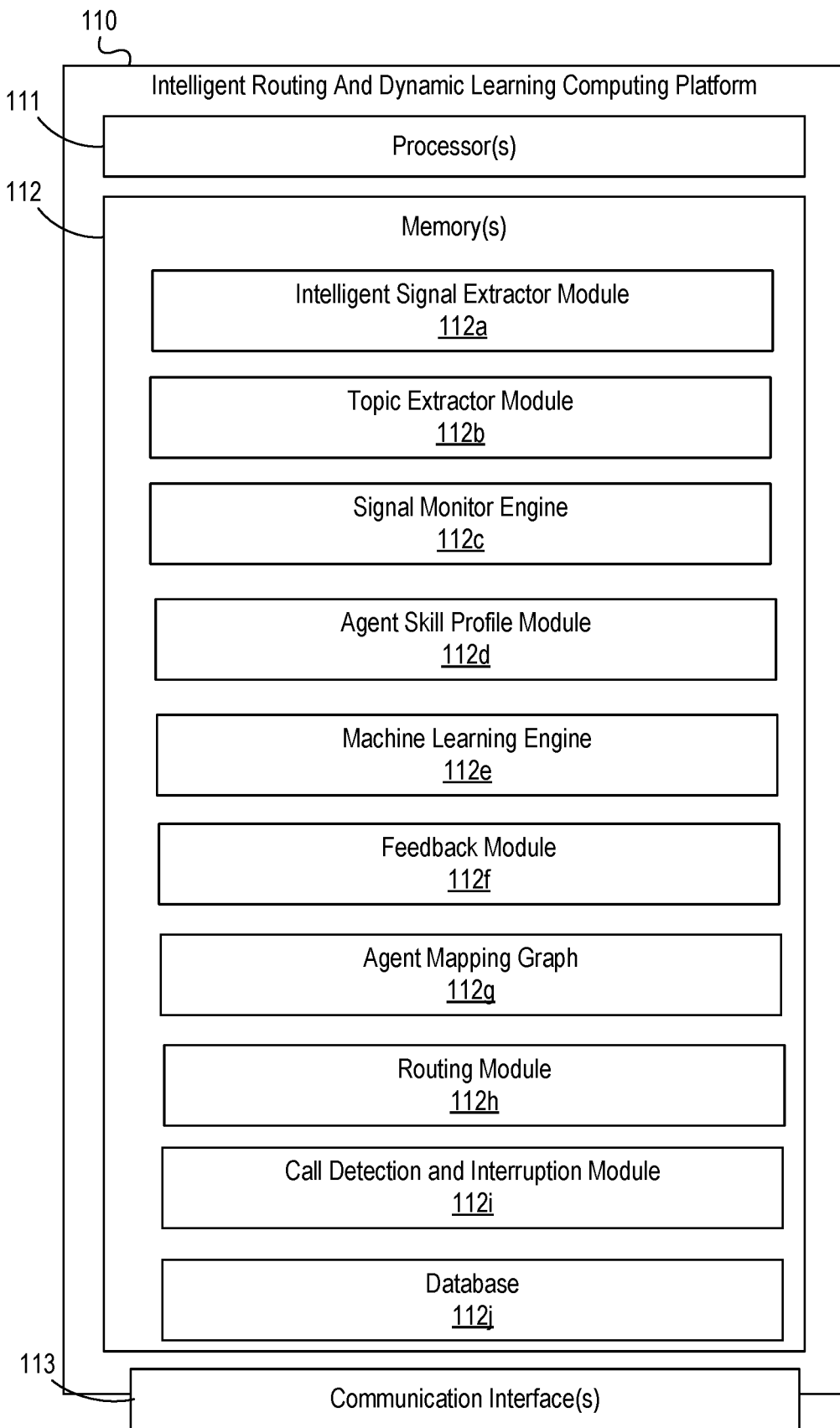

FIGS. 1A-1B depict an illustrative computing environment for implementing intelligent routing signaling and call interruption and dynamic learning functions in accordance with one or more aspects described herein. Referring to FIG. 1A, computing environment 100 may include one or more computing devices and/or other computing systems. For example, computing environment 100 may include intelligent routing and dynamic learning computing platform 110, internal entity computing system 120, internal entity computing system 125, remote user computing device 150 and remote user computing device 155. Although two internal entity computing systems 120, 125 and two remote user computing devices 150, 155 are shown, more or fewer devices or systems may be used without departing from the invention. Further, while intelligent routing and dynamic learning computing platform 110 is shown as a separate device, in some examples, intelligent routing and dynamic learning computing platform may be part of a same device as one or more other devices or systems, such as internal entity computing system 120, internal entity computing system 125, or the like.

Intelligent routing and dynamic learning computing platform 110 may be or include one or more computing devices (e.g., servers, server blades, or the like) and/or one or more computing components (e.g., memory, processor, and the like) and may be configured to provide dynamic, efficient intelligent communication session routing and dynamic learning functions. For instance, intelligent routing and dynamic learning computing platform 110 may receive audio data from an ongoing communication session, such as a call between a user and an agent of an enterprise organization. The audio data may be analyzed, using natural language processing, to extract a topic of the communication session, as well as metadata and signal data indicating parameters of the call, such as polarity of words (e.g., emotion of the agent, emotion of the customer, and the like), duration of call, amount of silence on call, a reference to a previous call, or the like. The intelligent routing and dynamic learning computing platform 110 may analyze the topic, metadata and signal data to determine whether the call should be flagged with an alert. In some examples, determining whether the call should be flagged with an alert may include comparing the topic and extracted metadata and signal data to data from previous calls to determine whether an alert was previously issued or should have been issued. In some examples, a signal monitor engine of the intelligent routing and dynamic learning computing platform 110 may perform the comparison and may generate a call routing alert score that may be input to a routing determination machine learning model.

Intelligent routing and dynamic learning computing platform 110 may further receive data related to the agent on the communication session. For instance, intelligent routing and dynamic learning computing platform 110 may receive agent skill mapping data identifying skills associated with each agent. In some examples, intelligent routing and dynamic learning computing platform 110 may receive call topic mapping data providing historical interactions of the agent with similar call topics. Intelligent routing and dynamic learning computing platform 110 may also receive case management data indicating performance of the agent on historical calls with similar topics and with different topics. In some examples, intelligent routing and dynamic learning computing platform 110 may generate an agent score based on the agent skill mapping data, call topic mapping data and the case management data indicating an overall expected performance of the particular agent for the particular topic of the current communication session.

Intelligent routing and dynamic learning computing platform 110 may input the agent score, call routing score, metadata and signals extracted from the call, and/or call topic mapping data providing historical interactions of the agent with similar call topics to the routing determination machine learning model to output one of more routing instructions.

For instance, if the communication session call parameters, agent score, and the like, indicate, based on execution of the routing determination machine learning model, that a supervisor should be involved in the call, the intelligent routing and dynamic learning computing platform 110 may automatically inform the user that the call is being routed to a supervisor and automatically route the call to a supervisor. In some examples, the routing determination machine learning model may weight the call routing score (e.g., whether an alert is attached to the call) more heavily than other factors in determining whether to automatically route the call to a supervisor.

Additionally or alternatively, the routing determination machine learning model may output an instruction to engage a second agent in the communication session. In some examples, the second agent may be automatically engaged in a second communication session with the agent. In some examples, the second agent may be automatically engaged with the agent and the user.

In some examples, the output of the routing determination machine learning model, as well as metadata and signals data extracted from the call, identified topics and subtopics of the call, and agent skill mapping information, may be input to a dynamic learning machine learning model. The dynamic learning machine learning model may identify agents (e.g., based on agent skill mapping information) who are subject matter experts in a topic or subtopic of the current communication session, as well as agents who are not subject matter experts. The non-subject matter experts may be flagged for training and the current communication session may be interrupted to dynamically join the identified non-subject matter experts and/or identified subject matter expert to the call to engage in a dynamic learning session. Upon termination of the call, the agent skill mapping information, the routing determination machine learning model and the dynamic learning machine learning model may be updated and/or validated.

Internal entity computing system 120 and/or internal entity computing system 125 may be or include one or more computing devices (e.g., servers, server blades, or the like) and/or one or more computing components (e.g., memory, processor, and the like) and may be configured to host or execute one or more customer service systems enabling communication sessions between one or more agents and one or more customers or users. In some examples, the communication sessions may be via telephone call, via online chat, or the like. In some examples, internal entity computing system 120 and internal entity computing system 125 may be computing devices associated with different agents of the enterprise organization.

Remote user computing device 150 and/or remote user computing device 155 may be or include computing devices such as desktop computers, laptop computers, tablets, smartphones, wearable devices, and the like, that may be associated with a user or customer (e.g., a customer of the enterprise organization, or the like). In some examples, remote user computing device 150 and/or remote user computing device 155 may be used to initiate a communication session with the internal entity computing system 120 and/or internal entity computing system 125 to address an issue.

As mentioned above, computing environment 100 also may include one or more networks, which may interconnect one or more of intelligent routing and dynamic learning computing platform 110, internal entity computing system 120, internal entity computing system 125, remote user computing device 150 and/or remote user computing device 155. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, intelligent routing and dynamic learning computing platform 110, internal entity computing system 120, and/or internal entity computing system 125, may be associated with an enterprise organization (e.g., a financial institution), and private network 190 may be associated with and/or operated by the organization, and may include one or more networks (e.g., LANs, WANs, virtual private networks (VPNs), or the like) that interconnect intelligent routing and dynamic learning computing platform 110, internal entity computing system 120, and/or internal entity computing system 125, and one or more other computing devices and/or computer systems that are used by, operated by, and/or otherwise associated with the organization. Public network 195 may connect private network 190 and/or one or more computing devices connected thereto (e.g., intelligent routing and dynamic learning computing platform 110, internal entity computing system 120, and/or internal entity computing system 125) with one or more networks and/or computing devices that are not associated with the organization. For example, remote user computing device 150 and/or remote user computing device 155 might not be associated with an organization that operates private network 190 (e.g., because remote user computing device 150 and/or remote user computing device 155 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect remote user computing device 150 and/or remote user computing device 155 to private network 190 and/or one or more computing devices connected thereto (e.g., intelligent routing and dynamic learning computing platform 110, internal entity computing system 120, and/or internal entity computing system 125).

Referring to FIG. 1B, intelligent routing and dynamic learning computing platform 110 may include one or more processors 111, memory 112, and communication interface 113. A data bus may interconnect processor(s) 111, memory 112, and communication interface 113. Communication interface 113 may be a network interface configured to support communication between intelligent routing and dynamic learning computing platform 110 and one or more networks (e.g., network 190, network 195, or the like). Memory 112 may include one or more program modules having instructions that when executed by processor(s) 111 cause intelligent routing and dynamic learning computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of intelligent routing and dynamic learning computing platform 110 and/or by different computing devices that may form and/or otherwise make up intelligent routing and dynamic learning computing platform 110.

For example, memory 112 may have, store and/or include intelligent signal extractor module 112*a*. In some examples, intelligent signal extractor module 112*a* may include instructions and/or data that may cause or enable the intelligent routing and dynamic learning computing platform 110 to receive audio data from one or more calls or communication sessions between a customer and an agent of the enterprise organization (e.g., ongoing calls) and extract metadata and signal data indicating parameters of the call, such as polarity of words, duration of call, amount of silence on call, a reference to a previous call, or the like. In some examples, the audio data from the call may be received in real-time and converted, in real-time, to text in one or more chunks for analysis by the intelligent signal extractor module 112*a*.

Intelligent routing and dynamic learning computing platform 110 may further have, store and/or include topic extractor module 112*b*. Topic extractor module 112*b* may store instructions and/or data that may cause or enable the intelligent routing and dynamic learning computing platform 110 to analyze the audio data (e.g., using natural language processing) to identify a topic of the call, sub-topic of the call, or the like.

Intelligent routing and dynamic learning computing platform 110 may further have, store and/or include signal monitor engine 112*c*. Signal monitor engine may store instructions and/or data that may cause or enable the intelligent routing and dynamic learning computing platform 110 to analyze the metadata and signals, as well as the call topic, to determine whether an alert should be issued for the call. For instance, signal monitor engine 112*c* may compare the call topic and/or metadata to a database of previous calls having alerts to determine whether an alert should be associated with a particular call.

Intelligent routing and dynamic learning computing platform 110 may further have, store and/or include agent skill profile module 112*d*. Agent skill profile module 112*d* may store instructions and/or data that may cause or enable the intelligent routing and dynamic learning computing platform 110 to retrieve historical signal mapping data associated with previous calls of a same or similar topic (e.g., whether signals were generated to route the call to a supervisor, add a second agent, outcome of previous calls from this agent for this topic, frequency of escalation for historical calls for a topic, or the like). Further, agent skill profile module 112*d* may store instructions and/or data that may cause or enable the intelligent routing and dynamic learning computing platform 110 to receive agent data associated with a same or different topic, receive agent skill profile data (e.g., skills attributed to or associated with each agent) and identify an agent score associated with the agent on a particular ongoing call.

Intelligent routing and dynamic learning computing platform 110 may further have, store and/or include a machine learning engine 112*e*. Machine learning engine 112*e* may store instructions and/or data that may cause or enable the intelligent routing and dynamic learning computing platform 110 to train, execute, update and/or validate one or more machine learning models. For instance, machine learning engine 112*e* may train a routing determination model to output, based on various inputs, a routing signal output. The routing signal output may be used to route an ongoing call (e.g., in real-time) to a supervisor, engage another agent in the call, or the like. The routing determination machine learning model may be trained using historical data related to previous calls, identified topics for calls, whether the calls were routed to a supervisor or another agent, or the like.

Machine learning engine 112*e* may further train a dynamic learning machine leaning model to output, based on various inputs, identification of one or more topics or sub-topics of concern (e.g., topics or sub-topics for which dynamic learning should be executed). The topics or sub-topics of concern may be used in monitoring ongoing calls to identify calls related to one or more topics or sub-topics of concern and execute dynamic learning for those calls. The dynamic learning machine learning model may be trained using historical data related to previous calls, agent skills data, and the like.

Intelligent routing and dynamic learning computing platform 110 may further have, store and/or include feedback module 112*f*. Feedback module 112*f* may store instructions and/or data that may cause or enable the intelligent routing and dynamic learning computing platform 110 to receive or retrieve feedback related to one or more calls or communications sessions. The feedback may be received via one or more channels (e.g., email, SMS, voice communication, or the like) and may be used in machine learning analysis performed by the intelligent routing and dynamic learning computing platform 110.

Intelligent routing and dynamic learning computing platform 110 may further have, store and/or include agent mapping graph 112*g*. Agent mapping graph 112*g* may store instructions and/or data that may cause or enable the intelligent routing and dynamic learning computing platform 110 to receive, store and/or update skills data related to one or more agents of the enterprise organization. For instance, one or more skills associated with each agent may be mapped to a respective agent in the agent mapping graph 112*g*. In some examples, the agent mapping graph 112*g* may further include identification of agents who are subject matter experts (SMEs) in one or more topics and agents who are not SMEs. In some examples, after a dynamic learning session has occurred, the agent mapping graph 112*g* may be updated or performance of one or more agents may be monitored before updating the agent mapping graph 112*g*.

Intelligent routing and dynamic learning computing platform 110 may further have, store and/or include routing module 112*h*. Routing module 112*h* may store instructions and/or data that may cause or enable the intelligent routing and dynamic learning computing platform 110 to receive a routing signal output from, for instance, routing determination machine learning model, and route a call to a supervisor, second agent, or the like. In some examples, routing module 112*h* may join one or more computing devices or systems to an ongoing call, may initiate an online chat between devices, or the like.

Intelligent routing and dynamic learning computing platform 110 may further have, store and/or include call detection and interruption module 112*i*. Call detection and interruption module 112*i* may store instructions and/or data that may cause or enable the intelligent routing and dynamic learning computing platform 110 to receive, from, for instance, dynamic learning machine learning model, identification of one or more topics or sub-topics of concern, monitor ongoing calls for calls related to the topics or sub-topics of concern, and interrupt the calls to join other identified available agents in a dynamic learning session.

Intelligent routing and dynamic learning computing platform 110 may further have, store and/or include database 112*j*. Database 112*j* may store data associated with historical calls, feedback, agent skills, and/or other data that enables performance of the aspects described herein by the intelligent routing and dynamic learning computing platform 110.

FIGS. 2A-2G depict one example illustrative event sequence for implementing intelligent call routing and dynamic learning in accordance with one or more aspects described herein. The events shown in the illustrative event sequence are merely one example sequence and additional events may be added, or events may be omitted, without departing from the invention. Further, one or more processes discussed with respect to FIGS. 2A-2G may be performed in real-time or near real-time.

Figure 2A:
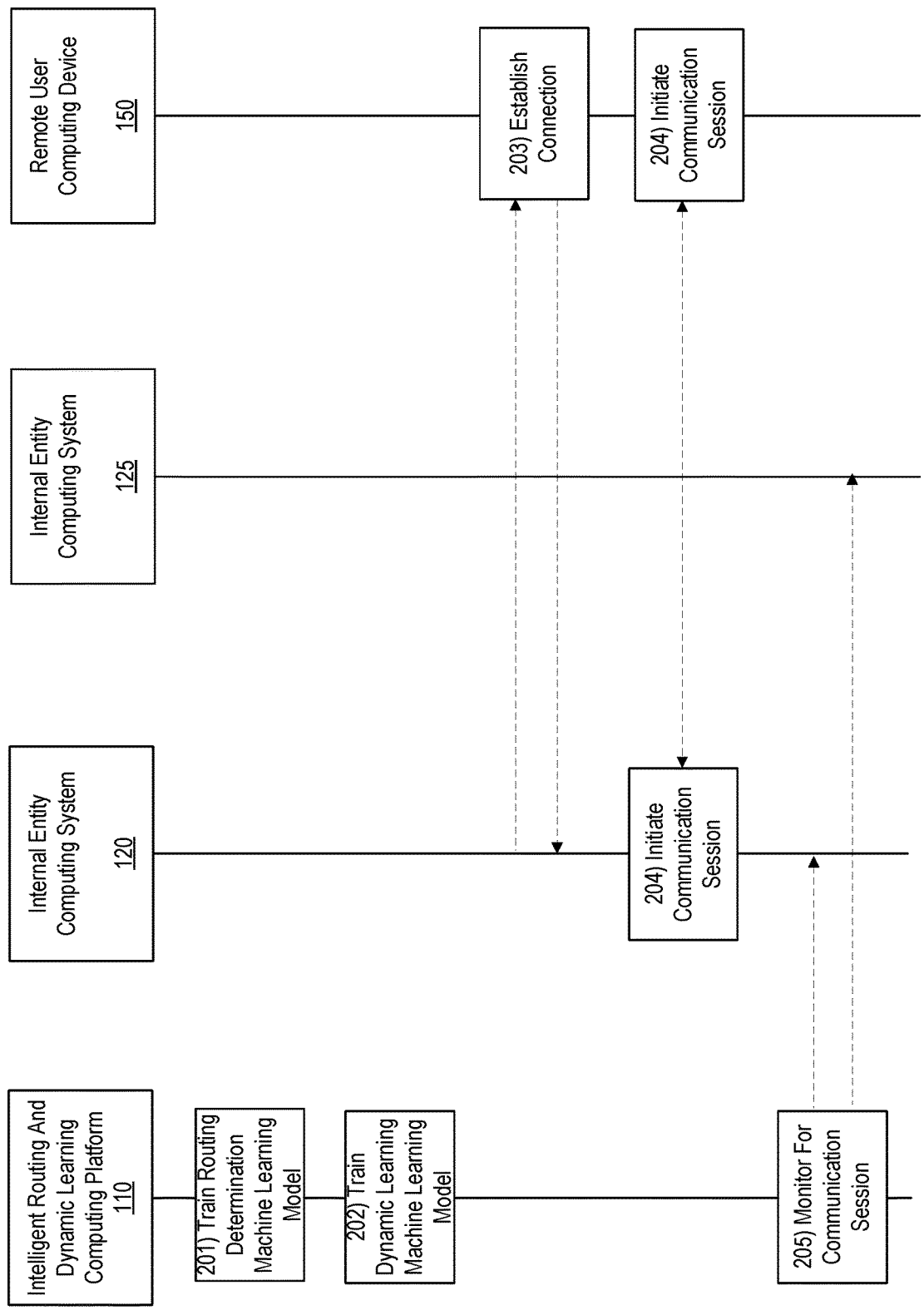

With reference to FIG. 2A, at step 201, intelligent routing and dynamic learning computing platform 110 may train a routing determination machine learning model. For instance, historical data related to previous calls to customer service, agent skill sets, requests for assistance from a supervisor associated with the previous calls, customer feedback, and the like, may be used to train the routing determination machine learning model to output a call routing signal. For instance, historical calls routed to a supervisor or for which a second agent was added, agent skills associated with those calls, feedback from customers and/or supervisors, topics of those calls, metadata from the calls and the like, may be used to train the routing determination machine learning model to identify correlations between a topic of a current call, an agent on the current call and whether the call should be escalated to a supervisor or an additional agent should be added to the call for assistance. Accordingly, the routing determination machine learning model may learn to recognize patterns or sequences in call parameters (e.g., topic of the call, metadata of the call, agent on the call, and the like) that may be used to output a signaling decision (e.g., whether to escalate to supervisor, engage a second agent, or the like).

In some examples, the routing determination machine learning model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models. In some examples, training the routing determination machine learning model may include training the model using labeled data (e.g., labeled data identifying confirmed calls in which a supervisor was added, had a positive outcome, or the like) and/or unlabeled data.

At step 202, intelligent routing and dynamic learning computing platform 110 may train a dynamic learning machine learning model. For instance, historical data related to previous calls between customers and agents, outcomes of the calls, topics and sub-topics of the calls, feedback from customers and/or supervisors, subject matter areas or skill sets associated with agents, and the like, may be used to train the dynamic learning machine learning model. In training the dynamic learning machine learning model, the dynamic learning machine learning model may learn to identify correlations between topics or sub-topics and positive or negative call outcomes, correlations between agents and positive or negative call outcomes, correlations between skills sets and positive or negative call outcomes, in order to output identification of a topic or sub-topic of concern (e.g., to identify calls in the topic or sub-topic for training or dynamic learning). Accordingly, the dynamic learning machine learning model may learn to recognize patterns or sequences in call parameters to output an indication of a topic or sub-topic of concern in order to identify dynamic learning opportunities.

In some examples, the dynamic learning machine learning model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models. In some examples, training the dynamic learning machine learning model may include training the model using labeled data (e.g., labeled data identifying agents with particular skills sets, agents who had an issue with a particular topic or sub-topic, or the like) and/or unlabeled data.

At step 203, remote user computing device 150 may establish a connection with a computing system or device associated with the enterprise organization. For instance, remote user computing device 150 may establish a connection with internal entity computing system 120, which may be or include a computing system or device associated with an agent (e.g., a customer service agent) of the enterprise organization. In some examples, a first wireless connection may be established between the remote user computing device 150 and the internal entity computing system 120.

Upon establishing the first wireless connection, a communication session may be initiated between the remote user computing device 150 and the internal entity computing system 120 at step 204. For instance, a call or other communication session between a user of remote user computing device 150 and an agent or user of internal entity computing system 120 may be initiated.

At step 205, intelligent routing and dynamic learning computing platform 110 may monitor internal entity computing systems or devices, such as internal entity computing system 120 and/or internal entity computing system 125, to detect a communication session (e.g., a call or other communication session between a user device and an agent device).

Figure 2B:
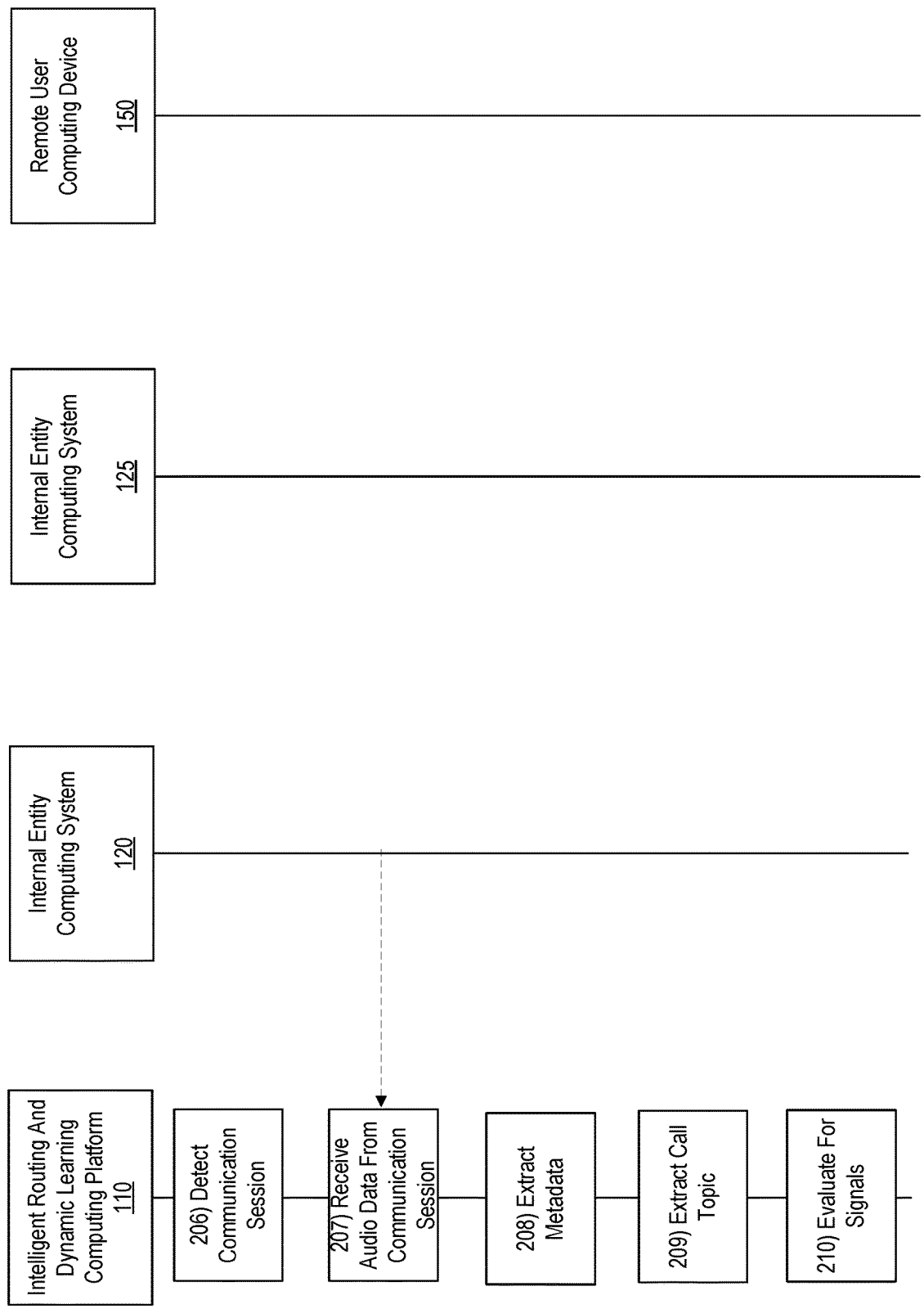

With reference to FIG. 2B, at step 206, intelligent routing and dynamic learning computing platform 110 may detect a communication session or call. For instance, intelligent routing and dynamic learning computing platform 110 may detect the communication session or call between internal entity computing system 120 and remote user computing device 150 initiated at step 204.

At step 207, intelligent routing and dynamic learning computing platform 110 may receive audio data from the call. For instance, audio data of the interaction between the user and the agent (e.g., with appropriate permissions and/or notifications) may be received. In some examples, the audio data may be received in real-time or near real-time and may be received as streaming data, in chunked utterances, or the like. The intelligent routing and dynamic learning computing platform 110 may then analyze the received audio data.

At step 208, intelligent routing and dynamic learning computing platform 110 may extract metadata and/or signal data from the audio data. For instance, intelligent routing and dynamic learning computing platform 110 may extract word polarity from the audio data, amount of silent time in the audio data, a reference to a previous call in the audio data, a call time of the audio data, and the like. In some examples, the extracted metadata and/or signal data may be used as an input to the routing determination machine learning model.

At step 209, intelligent routing and dynamic learning computing platform 110 may extract a call topic from the audio data. For instance, natural language processing may be used to analyze the audio data and extract or identify a call topic from the processed audio data.

At step 210, intelligent routing and dynamic learning computing platform 110 may evaluate the call topic and extracted metadata and/or signal data to determine whether an alert signal should be associated with the call being analyzed. For instance, the call topic and extracted metadata may be compared to pre-stored, historical data associated with previous calls for which alerts were generated (e.g., calls in which a user asked to be transferred to a supervisor, calls for which agents often request assistance, stored emotion data from previous calls, and the like). In some examples, an alert may be associated with a call if, for instance, a supervisor or manager was requested (e.g., by the customer or agent on the call), if another agent was asked to join the call to assist, if the customer issue was not resolved, or the like. Accordingly, a database may include historical calls that included alerts, as well as the call topics and metadata associated with those calls. The current call topic and metadata may be compared to the database of historical calls with alerts to determine whether the data matches. In some examples, a match of at least a threshold number of factors being compared may constitute a match. For instance, if five factors are being compared or evaluated (e.g., call topic, amount of silent time, word polarity, whether there was a reference to a previous call and a time or duration of the call), if at least three factors match data from the current call (e.g., an exact match, a match within a predetermined threshold, or the like), an alert may be generated for that call. Although a threshold of three of five factors is used in this example, additional or fewer factors, and other thresholds, may be used without departing from the invention.

Additionally or alternatively, each factor being considered may be scored (e.g., based on matching characteristics). The sum of the score for each factor may be determined and compared to a threshold. If the score (e.g., alert score) is at or above the threshold, an alert may be associated with the communication session or call.

The alert, if generated, may be used to indicate that the topic or other data associated with the call has historically been an issue and a supervisor may be needed. If an alert was generated (and, in some examples, if an alert was not generated) may be used as an input to the routing determination machine learning model.

With reference to FIG. 2C, at step 211, intelligent routing and dynamic learning computing platform 110 may evaluate historical signals from previous, historical calls, that may identify signals mapping with a same or similar topic as the current call. For instance, call routing, additional agents, and the like, for calls of a similar or same call topic associated with the agent on the current call may be retrieved from historical data and used as an input to the routing determination machine learning model.

At step 212, intelligent routing and dynamic learning computing platform 110 may determine an agent score for the agent on the current call. For instance, intelligent routing and dynamic learning computing platform 110 may further receive data related to the agent on the communication session. For instance, intelligent routing and dynamic learning computing platform 110 may receive agent skill mapping data identifying skills associated with each agent. Intelligent routing and dynamic learning computing platform 110 may also receive case management data indicating performance of the agent on historical calls with similar topics and with different topics, historical performance of all agents with respect to a particular topic (e.g., frequency of escalation, or the like). In some examples, intelligent routing and dynamic learning computing platform 110 may generate an agent score based on the agent skill mapping data and the case management data indicating an overall expected performance of the particular agent for the particular topic of the current communication session. The agent score may be used as an input to the routing determination machine learning model.

At step 213, intelligent routing and dynamic learning computing platform 110 may execute the routing determination machine learning model. For instance, the extracted metadata signals, whether an alert was generated (e.g., a binary output), historical mapping signals, and the agent score may be input to the routing determination machine learning model and the model may be executed. Executing the model may include identifying patterns or sequences in the data to generate a signal mapping output.

For instance, at step 214, a routing signal may be output by the routing determination machine learning model. For instance, a routing signal may include an instruction for the agent to continue with the call (e.g., no issue or potential issue identified), an instruction for the call to be transferred to a supervisor (e.g., if an alert is attached) and/or an instruction to join one or more other agents to provide assistance (e.g., if a routing signal is generated but an alert is not attached). In some examples, joining one or more other agents may include initiating an online chat between the current agent and the one or more additional agents (e.g., without the one or more additional agents joining the call with the user or customer) and/or may include the one or more other agents joining the ongoing call between the agent and the user or customer.

Figure 2D:
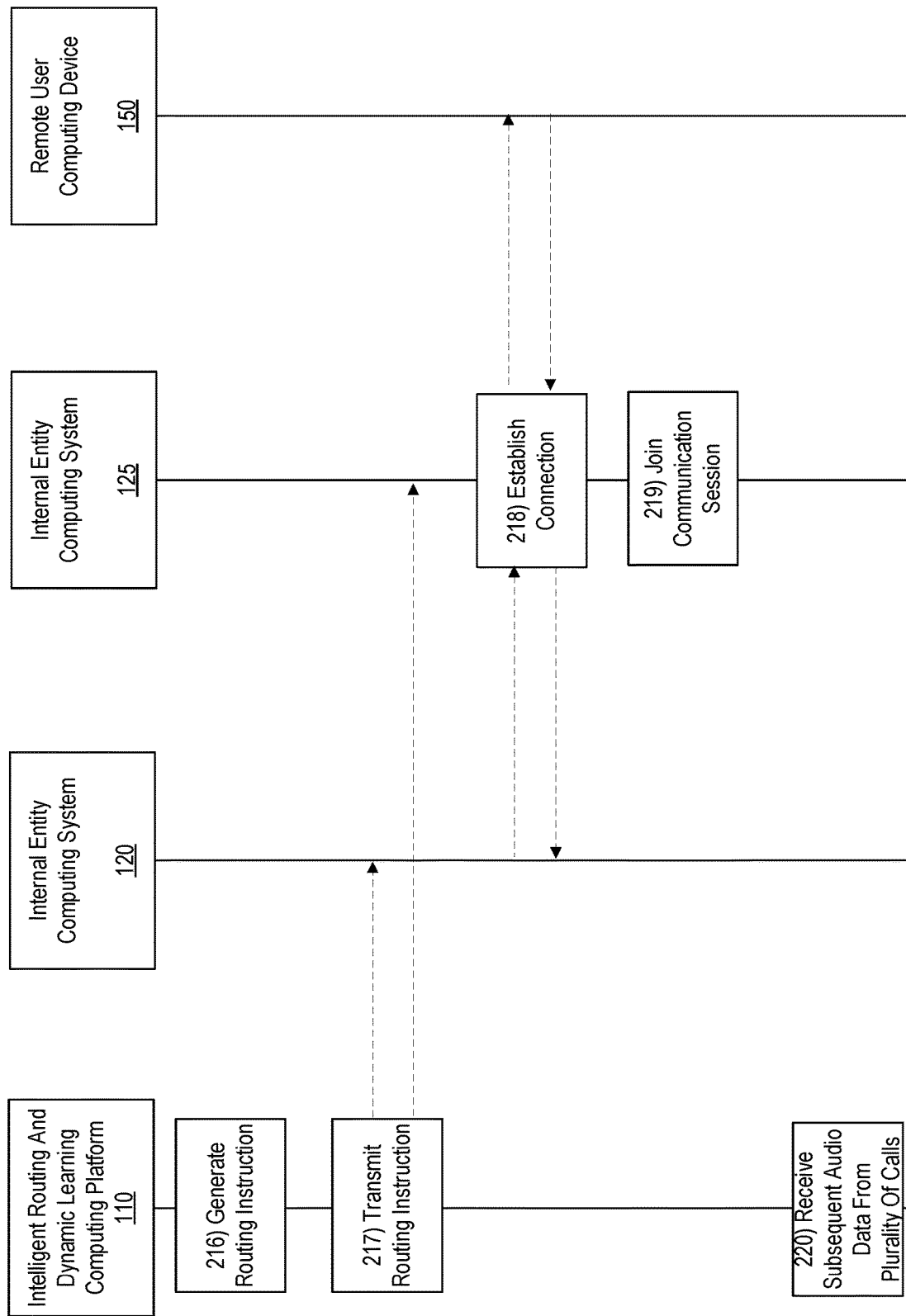

At step 215, intelligent routing and dynamic learning computing platform 110 may evaluate the routing signal output by the routing determination machine learning model and, at step 216 in FIG. 2D, may generate a routing instruction. For instance, intelligent routing and dynamic learning computing platform 110 may generate an instruction or command causing one or more additional computing devices or systems to join a call, to join an online chat session, or the like.

At step 217, the intelligent routing and dynamic learning computing platform 110 may transmit or send the generated routing instruction to one or more computing devices or systems, such as internal entity computing system 120 (e.g., the device or system associated with the agent on the current call) and internal entity computing system 125 (e.g., a device or system associated with a supervisor who is instructed to join the call, associated with one or more other agents who may be joining the call or otherwise communicating with the agent on the current call, or the like). Although FIG. 2D includes transmitting the instruction to two internal entity computing systems 120, 125, the instruction may be sent to more or fewer devices or systems without departing from the invention. Further, in some examples, the routing signal may include a routing instruction that is automatically executed.

At step 218, internal entity computing system 125 (e.g., the device or system associated with the supervisor or additional agent joining the call or otherwise being connected to the current agent on the call) may, in some examples, establish a connection with internal entity computing system 120 and/or remote user computing device 150 to join the ongoing call between the agent associated with internal entity computing system 120 and user or customer associated with remote user computing device 150, to communicate with the agent associated with internal entity computing system 120, or the like. For instance, a second wireless connection may be established between internal entity computing system 125 and internal entity computing system 120 and/or a third wireless connection may be established between internal entity computing system 125 and remote user computing device 150. For instance, if a supervisor or second agent is joining a call, both the second and third wireless connections may be established to initiate a communication session between all three of internal entity computing system 120, internal entity computing system 125 and remote user computing device 150. Additionally or alternatively, a supervisor or second agent may be connected to only the agent associated with internal entity computing system 120 to initiate a communication session between internal entity computing system 120 and internal entity computing system 125 (e.g., an online chat, a call separate from the call between the user or customer and current agent, or the like).

At step 219, internal entity computing system 125 may receive and execute the instruction to join the call or otherwise initiate a communication session between internal entity computing system 125 and one or more of internal entity computing system 120 and remote user computing device 150.

At step 220, intelligent routing and dynamic learning computing platform 110 may receive audio data from a plurality of other calls between agents and customers or users. For instance, audio data from a plurality of calls to the enterprise organization may be received and analyzed to identify dynamic learning opportunities.

With reference to FIG. 2E, at step 221, one or more topics or sub-topics of each call being analyzed may be identified. For instance, audio data from each call may be processed using, for instance, natural language processing, to identify one or more topics, sub-topics, or the like, of one or more of the plurality of calls. For instance, a topic may be identified as a "merchant transaction" and a sub-topic may include "processing the transaction." Accordingly, particular areas for training may be identified. The identified topics and/or sub-topics may be used as inputs to the dynamic learning machine learning model.

At step 222, intelligent routing and dynamic learning computing platform 110 may extract metadata and/or signal data from the audio data from the plurality of calls. For instance, intelligent routing and dynamic learning computing platform 110 may extract word polarity from the audio data, amount of silent time in the audio data, a reference to a previous call in the audio data, a call time of the audio data, and the like. In some examples, the extracted metadata and/or signal data may be used as an input to the dynamic learning machine learning model.

At step 223, intelligent routing and dynamic learning computing platform 110 may identify or retrieve feedback for one or more calls of the plurality of calls, one or more agents associated with the plurality of calls, and the like. The feedback may be customer feedback, supervisor feedback, or the like. In some examples, the feedback may be associated with a particular call and may include feedback received via one or more channels (e.g., during the call, a post-call survey via email, SMS, or the like, and the like). The feedback may be used as an input to the dynamic learning machine learning model.

At step 224, intelligent routing and dynamic learning computing platform 110 may execute the dynamic learning machine learning model. For instance, the identified topics and/or sub-topics, extracted metadata, and feedback may be input to the machine learning model. In some examples, an signaling output from the routing determination machine learning model for a particular call, as well as other inputs to the routing determination machine learning model (e.g., agent score, alerts, or the like) may be input to the machine learning model. The dynamic learning machine learning model may be executed using the received inputs and may identify patterns or sequences in the received data to output one or more topics or sub-topics of concern at step 225. A topic or sub-topic of concern may be topics or sub-topics for which feedback was lower than a threshold, negative metadata was detected, calls were routed to a supervisor, or the like, and for which dynamic learning or training should be performed. For instance, the topic or sub-topic of concern output by the machine learning model may include a prediction of a likelihood that a call related to a particular topic or sub-topic will be resolved by an agent (e.g., of 100 calls, if 80% are resolved then 20% are likely to have issues or be of concern). In some examples, the likelihood may be compared to a threshold that, if met or exceeded, would then flag a particular topic or sub-topic as a topic or sub-topic of concern.

Accordingly, based on the identified topics or sub-topics of concern, the intelligent routing and dynamic learning computing platform 110 may monitor ongoing or subsequent calls for an event trigger (e.g., an ongoing call associated with the topics or sub-topics or concern) and identify those calls as dynamic learning opportunities.

Figure 2F:
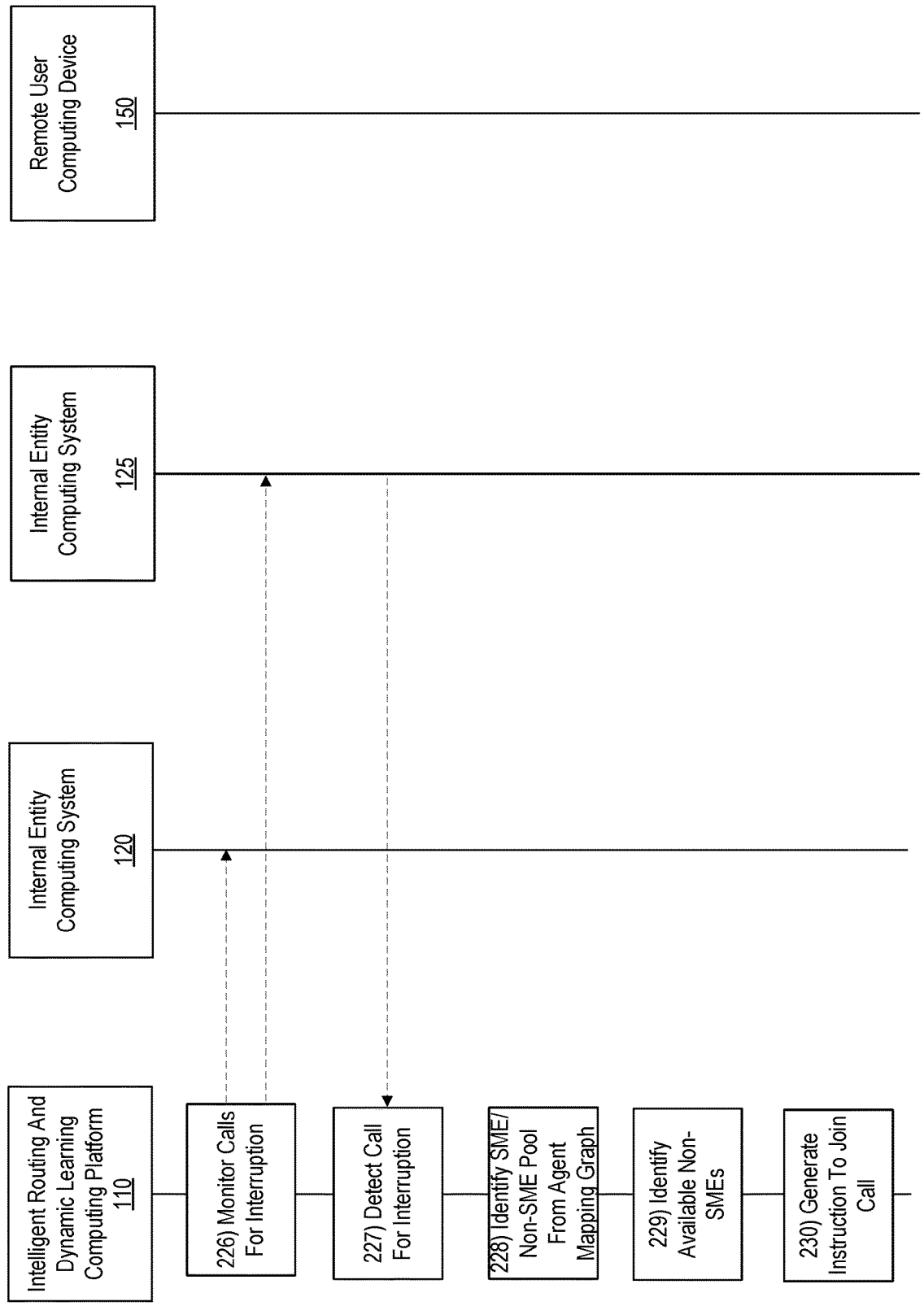

For instance, with reference to FIG. 2F, at step 226, intelligent routing and dynamic learning computing platform 110 may monitor one or more enterprise organization systems or devices, such as internal entity computing system 120, internal entity computing system 125, or the like, for calls related to the topics or sub-topics or concern and that may be interrupted to execute a dynamic learning function.

At step 227, intelligent routing and dynamic learning computing platform 110 may detect a call associated with a topic or sub-topic of concern ongoing at internal entity computing system 125. For instance, audio from the calls may be analyzed (e.g., using natural language processing) to identify topics or sub-topics of ongoing calls (e.g., as in step 221). Based on this analysis and identification of a topic or sub-topic of a particular call, the intelligent routing and dynamic learning computing platform 110 may detect a match between a topic or sub-topic of an ongoing call and a topic or sub-topic of concern. Upon identifying or detecting the match, the intelligent routing and dynamic learning computing platform 110 may flag the call for dynamic learning.

In some examples, flagging the call for dynamic learning may also include evaluating an agent on the ongoing call. For instance, agent mapping data (e.g., mapping one or more skills to one or more agents who possess those skills) from an agent mapping graph may be used to determine whether the agent in the ongoing call is a subject matter expert (SME) in the topic or sub-topic of the call. In some examples, an SME may be based on a number of successful calls associated with a topic being over a threshold, a particular skill associated with the user, an identified proficiency, or the like. In some examples, the agent mapping graph may include a flag associated with agents who are SMEs in various topics or sub-topics.

Accordingly, in some examples, the call may be flagged for dynamic learning if it is related to topic or sub-topic of concern and if the agent on the call is an SME in the topic or sub-topic of concern associated with the call.

At step 228, the intelligent routing and dynamic learning computing platform 110 may analyze agent mapping data in the agent mapping graph to identify agents who are SMEs and non-subject matter experts in the topic or sub-topic of the flagged call.

At step 229, agents identified as non-SMEs at step 228 may be further evaluated to determine a current status of each non-SME agent. For instance, if a non-SME agent is currently unavailable (e.g., on another call, or the like) the agent might not be considered for dynamic learning for this call. For non-SME agents having a current status of available (e.g., awaiting a call, or the like), the available agents may be flagged for dynamic learning. In some examples, the status of each agent may be based on current computer activity (e.g., idleness of mouse or keyboard), current phone line status (e.g., whether the agent is engaged in a call), or the like.

For non-SME agents identified as available, intelligent routing and dynamic learning computing platform 110 may generate and send a notification indicating the agent has been identified for dynamic learning. For instance, FIG. 5 illustrates one notification 500 that may be sent to one or more non-SME agents identified as available. The notification 500 includes identification of the subject of the dynamic learning session, as well as an interactive link that, when selected, may join the user to a call, queue to join the call, or the like. In some examples, transmitting or sending the notification may cause the notification to be displayed by a display of the receiving computing device (e.g., internal entity computing system 120).

With further reference to FIG. 2F, at step 230, intelligent routing and dynamic learning computing platform 110 may generate an instruction or command to cause one or more additional computing devices or systems to join the ongoing call at which the topic or sub-topic of concern was detected.

Figure 2G:
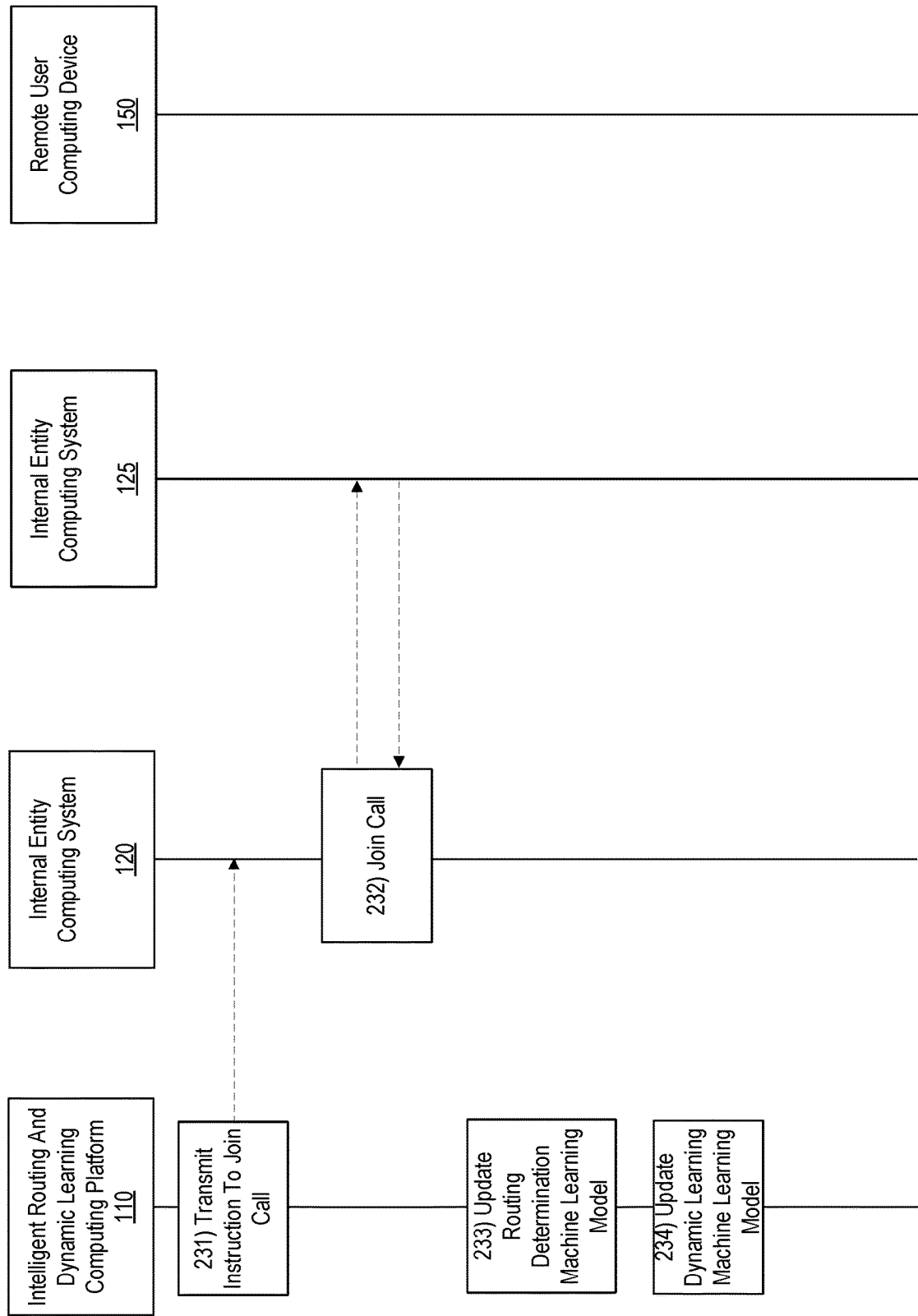

With reference to FIG. 2G, at step 231, intelligent routing and dynamic learning computing platform 110 may transmit or send the instruction to one or more computing devices or systems associated with non-SME agents identified as available. For instance, intelligent routing and dynamic learning computing platform 110 may transmit or send the instruction to join the call to internal entity computing system 120. In some examples, the instruction may include the notification described above and shown in FIG. 5.

At step 232, internal entity computing system 120 may receive the instruction and execute the instruction to join the call. In some examples, executing the instruction may include automatically joining the internal entity computing system 120 to the ongoing call at internal entity computing system 125. Additionally or alternatively, executing the instruction may include causing display of the notification shown in FIG. 5.

In some examples, joining the call may include joining more than one computing device or system to the call. For instance, a plurality of non-SME agents may be identified as available and all may be joined to the call regardless of location, or the like. Accordingly, dynamic learning sessions may be held for users in a plurality of physical locations.

In some arrangements, joining the call may include interrupting the call to inform the agent and/or user customer that additional agents may be joining. In other examples, with permissions, the additional non-SME agents may be joined to the call in a manner that enables them to listen to the call but not participate (e.g., their lines may be muted upon connection, or the like). Based on the executed dynamic learning sessions, the agent mapping data in the agent mapping graph may be updated to include information related to agents who participated in the dynamic learning session. In some examples, monitoring of agents' performance for the topic or sub-topic of concern may be performed prior to updating the agent mapping graph.

In some examples, when the call is completed, the non-SME agents in the dynamic learning session may be severed or terminated from the call.

At step 233, the routing determination machine learning model may be updated and/or validated. For instance, a dynamic feedback loop may be used to continuously update or validate the routing determination machine learning model in order to continuously improve accuracy of the routing determination machine learning model. In some examples, updating or validating the routing determination machine learning model may include updating the routing determination machine learning model based on routing instructions generated, feedback from one or more channels related to a call or communication session, or the like. In some examples, outputs from the dynamic learning machine learning model, one or more dynamic learning sessions that were executed, updates to the agent mapping graph based on dynamic learning sessions executed, and the like, may be used to update or validate the routing determination machine learning model.

At step 234, intelligent routing and dynamic learning computing platform 110 may update and/or validate the dynamic learning machine learning model. For instance, a dynamic feedback loop may be used to continuously update and/or validate the dynamic learning machine learning model in order to continuously improve accuracy of the dynamic learning machine learning model. In some examples, updating or validating the dynamic learning machine learning model may include updating the dynamic learning machine learning model based on executing dynamic learning sessions, updates to agent mapping data based on dynamic learning sessions, analysis of additional calls, feedback from one or more channels, or the like.

Figure 3:
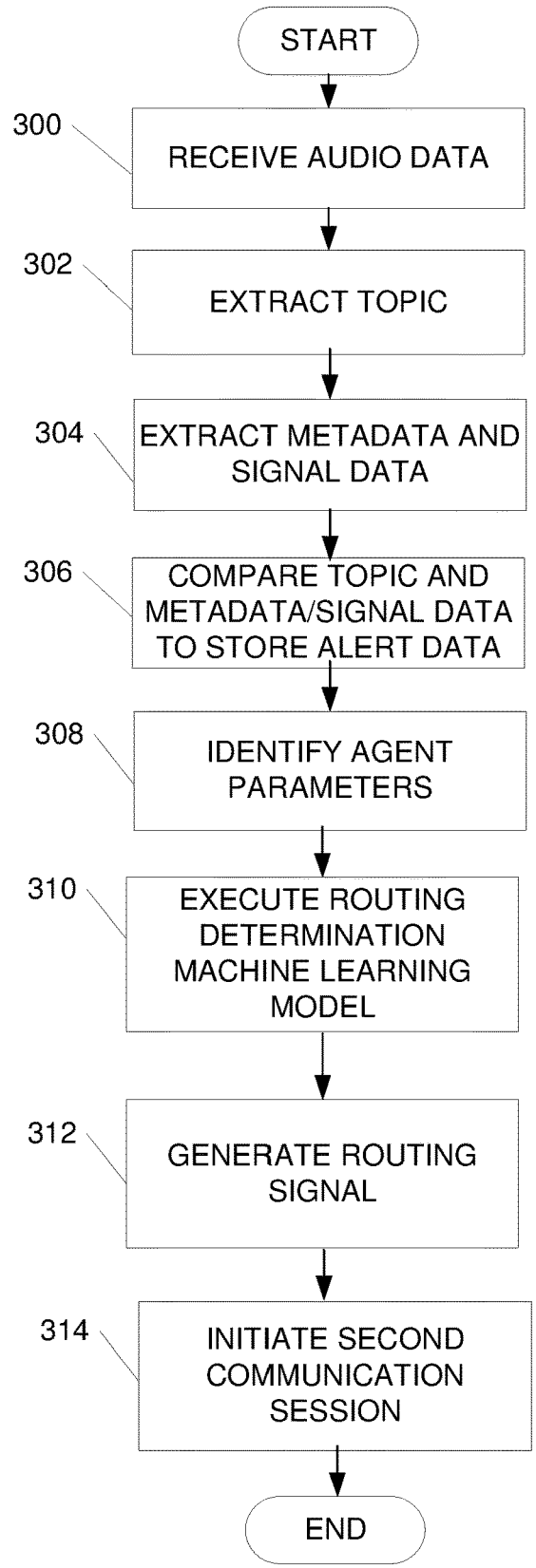
FIG. 3 depicts an illustrative method for intelligent routing in accordance with one or more aspects described herein.

FIG. 3 is a flow chart illustrating one example method of intelligent routing in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, audio data from a communication may be received by a computing platform, such as intelligent routing and dynamic learning computing platform 110. In some examples, the audio data may be received in real-time from an ongoing communication session between a first computing device associated with a user or customer and a second computing device associated with an agent of an enterprise organization (such as a customer service agent of the enterprise organization).

At step 302, the computing platform may extract topic data from the communication session. For instance, the audio data may be converted to text and/or natural language processing may be used to extract a topic of the communication session.

At step 304, the computing platform may extract metadata and signal data from the audio data. For instance, the analyzed audio data may be further analyzed to extract metadata and signal data identifying parameters of the communication session, such as periods of silence, duration of the call, word polarity, references to previous calls, and the like.

At step 306, the extracted topic and metadata/signal data may be compared to alert data stored in, for instance, a database. For instance, historical data identifying calls, topics, patterns, signals, and the like, that led to escalation to a supervisor or addition of another agent to a communication session or call may be stored in a database and, in some examples, the topic and metadata/signal data may be compared to the stored data to output whether an alert will be associated with the communication session. In some examples, a score may be generated based on the topic, metadata, signal data, database matching data, and the like. The score may be compared to a threshold and, if the score meets or exceeds the threshold, an alert may be associated with the call.

At step 308, agent parameters associated with an agent engaged in the communication session may be identified. For instance, skills of the agent, historical performance related to the same or similar topics, as well as different topics, and/or outcomes of historical calls with similar topics may be identified. In some examples, an agent score may be determined based on the agent parameters (e.g., each parameter may be scored and a sum of the score may be an agent score).

At step 310, the computing platform may execute a routing determination machine learning model. In some examples, executing the routing determination machine learning model may include inputting, to the routing determination machine learning model, the extracted topic of the communication session, the extracted metadata and signal data identifying parameters of the communication session, the output of whether the alert will be attached to the communication session, and the agent parameters to output a routing signal. At step 312, the routing signal or instruction based on the routing signal may be generated based on the output of the routing determination machine learning model.

At step 314, based on the routing signal, a second communication session may be initiated between the at least the second computing device of the agent and a third computing device of at least one of: another agent or a supervisor. In some examples, initiating the second communication session may be performed automatically based on the output routing signal. In some arrangements, initiating the second communication session may include initiating the second communication session between the first computing device of the user, the second computing device of the agent and the third computing device of at least one of: another agent and the supervisor. In some examples, initiating the second communication session may include joining the third computing device of the at least one of: another agent or the supervisor to the first communication session between the first computing device of the user and the second computing device of the agent. The second communication session may include an online chat between two or more devices (e.g., the second computing device and the third computing device).

Figure 4:
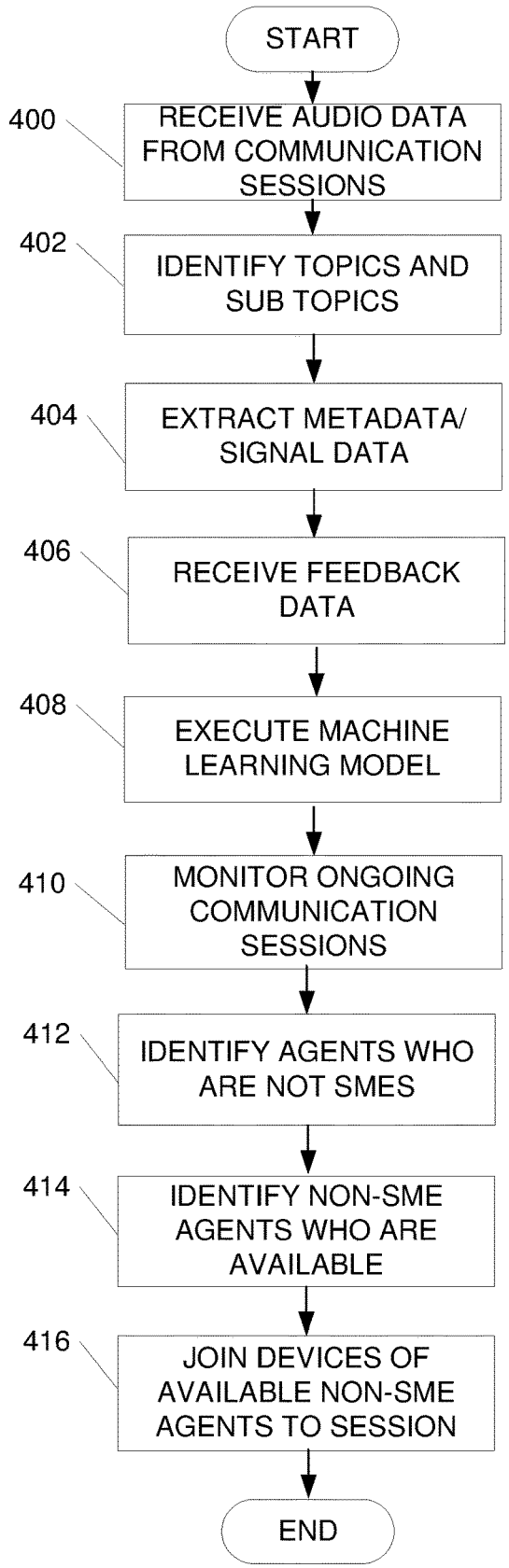
FIG. 4 depicts an illustrative method for dynamic learning in accordance with one or more aspects described herein.

FIG. 4 flow chart illustrating one example method of dynamic learning in accordance with one or more aspects described herein. The processes illustrated in FIG. 4 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 4 may be performed in real-time or near real-time.

At step 400, a computing platform, such as intelligent routing and dynamic learning computing platform 110, may receive, from a plurality of communications sessions, audio data associated with each communication session of the plurality of communications sessions. In some examples, each communication session may be between a first computing device associated with an agent of an enterprise organization and a second computing device associated with a user or customer.

At step 402, the computing platform may identify, from the audio data associated with each communication session of the plurality of communication sessions, a topic and sub-topic of each communication session. For instance, audio data from a respective communication session may be received and analyzed using natural language processing. Based on the natural language processing, a topic and sub topic of each communication session may be identified.

At step 404, the computing platform may extract, from the audio data associated with each communication session, metadata and signal data associated with each communication session. For instance, aspects such as duration of the call, periods of silence, references to previous calls, and the like, may be extracted.

At step 406, the computing platform may receive feedback data. For instance, feedback data associated with the plurality of communication sessions may be received. In some examples, the feedback data may be received from a plurality of different communication channels, such as email, SMS, or the like.

At step 408, the computing platform may execute a dynamic learning machine learning model. In some examples, executing the dynamic learning machine learning model may include inputting, to the model, the identified topic and sub-topic, the extracted metadata and signal data for each communication session, and the received feedback data, to output one or more topics or sub-topics of concern. The topics or sub-topics of concern may be topics or sub-topics identified as not having a sufficient number of agents skilled in that topic or sub-topic, of having more than a threshold number of negative outcomes of calls associated with the topic or sub-topic, of needing additional training for agents, or the like.

At step 410, the computing platform may monitor a plurality of ongoing communication sessions to identify an ongoing communication session related to one of: a topic or sub-topic of concern. In some examples, the identified ongoing communication session may be between an agent identified as a subject matter expert in the one of: the topic or sub-topic of concern and a user.

At step 412, the computing platform may identify, based on an agent mapping graph, a first plurality of agents who are not subject matter experts in the identified topic or sub-topic of concern. For instance, an agent mapping graph identifying one or more skills of one or more agents may be used to identify a plurality of agents who are not identified as subject matter experts in the topic or sub-topic of the identified ongoing communication session.

At step 414, the computing platform may identify, from the first plurality of agents who are not subject matter experts, a second plurality of agents having an available status. In some examples, the second plurality of agents may be a subset (e.g., less than all) of the first plurality of agents. In some arrangements, the available status of an agent may be based on current computing device activity of the agent, such as mouse activity, keyboard activity, or the like.

At step 416, the computing platform may join, to the identified ongoing communication session related to one of: the topic or sub-topic of concern, computing devices of the second plurality of agents to execute a dynamic learning session. Accordingly, the non-SME agents may be quickly identified and joined to an ongoing call, in real-time, to learn from the SME agent on the call. In some examples, joining the second plurality of agents to the identified ongoing communication session may include generating a notification that they will be joined to the dynamic learning session and transmitting or sending the notification to the computing devices of the second plurality of agents. In some examples, transmitting or sending the notification may cause the notification to display on displays of the computing devices of the second plurality of agents.

Accordingly, as discussed herein, arrangements described including using machine learning to identify opportunities or scenarios in ongoing calls (e.g., in real-time) to add an additional agent to a call, route the call to a supervisor or the like. Further, aspects described herein use machine learning to identify topics in which training should be provided and dynamically identify training opportunities in going calls (e.g., in real-time) to join identified agents to those calls for dynamic learning sessions.

While the arrangements described herein are generally provided in the context of a human user communicating with a human agent, aspects described may also be used to identify routing signals in communication sessions in which a human user is communicating with, for instance, an interactive voice response (IVR) system.

As discussed herein, in some examples, a routing signal and/or instruction may be generated. For instance, a signal to route a call to a supervisor, to add an additional agent, or the like, may be generated. In some examples, the routing signal may include generating a notification to the customer or user and agent that a supervisor is going to be joined to the call. In some examples, the supervisor may be automatically joined after the notification. Alternatively, the customer and/or agent may approve the supervisor joining before the supervisor is joined.

Similarly, if an additional agent is being added, in some examples, the additional agent may be automatically added or added after notification and acceptance. In some examples, the additional agent may be added in a separate communication session (e.g., a separate call, an online chat, or the like) that may be between the agents and might not include the user or customer.

In some dynamic learning arrangements, an identified topic or sub-topic of concern (and/or identified agents for training in that dynamic learning session) may be placed in a queue for dynamic learning. For instance, the system may prioritize topics or sub-topics of concern for identification in ongoing communication sessions. For instance, if a topic of sub-topic is particularly unlikely to be resolved, or if many agents are not subject matter experts, that topic or sub-topic may be higher in a queue than topics or sub-topics or more likely to be resolved or having fewer non-SMEs. In another example, the machine learning model may output the topics or sub-topics of concern and the topics or sub-topics may be added to the queue for monitoring based on an order of identification (e.g., so longest standing issues may be addressed sooner than newly identified issues).

Accordingly, the dynamic learning arrangements provided herein allow for dynamic training and learning across various physical locations. For instance, by identifying topics for training and agents for training from a plurality of physical locations, geographic locations, or the like, and joining them in dynamic learning sessions, agents may be trained more consistently and without needing a call on a particular topic to be received by a particular call center. Accordingly, enterprise organizations who have call centers in more than one location and efficiently and consistently train agents.

Figure 6:
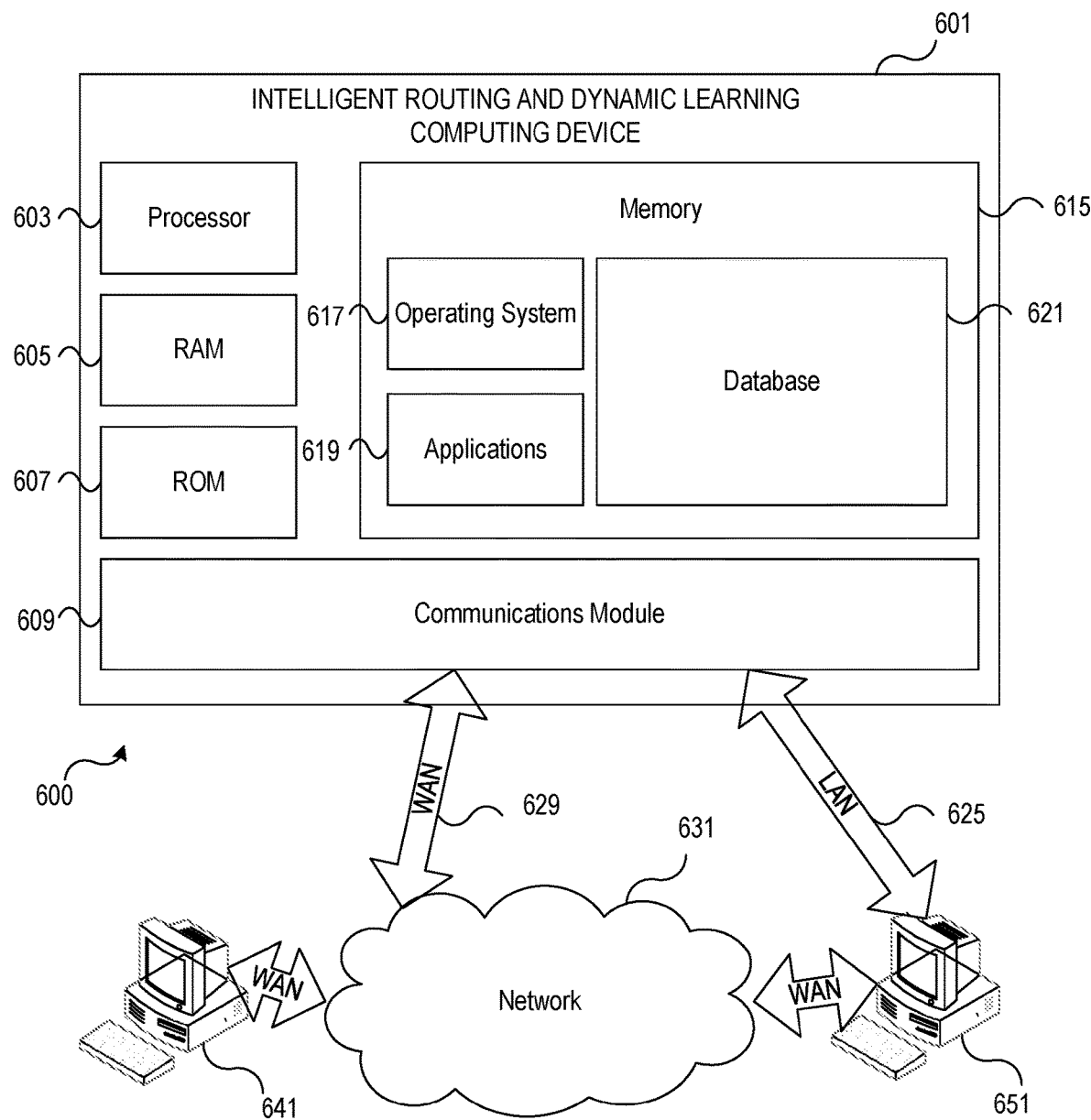
FIG. 6 illustrates one example environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include intelligent routing and dynamic learning computing device 601 having processor 603 for controlling overall operation of intelligent routing and dynamic learning computing device 601 and its associated components, including Random Access Memory (RAM) 605, Read-Only Memory (ROM) 607, communications module 609, and memory 615. Intelligent routing and dynamic learning computing device 601 may include a variety of computer readable media. Computer readable media may be any available media that may be accessed by intelligent routing and dynamic learning computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by intelligent routing and dynamic learning computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on intelligent routing and dynamic learning computing device 601. Such a processor may execute computer-executable instructions stored on a computer-readable medium.

Software may be stored within memory 615 and/or storage to provide instructions to processor 603 for enabling intelligent routing and dynamic learning computing device 601 to perform various functions as discussed herein. For example, memory 615 may store software used by intelligent routing and dynamic learning computing device 601, such as operating system 617, application programs 619, and associated database 621. Also, some or all of the computer executable instructions for intelligent routing and dynamic learning computing device 601 may be embodied in hardware or firmware. Although not shown, RAM 605 may include one or more applications representing the application data stored in RAM 605 while intelligent routing and dynamic learning computing device 601 is on and corresponding software applications (e.g., software tasks) are running on intelligent routing and dynamic learning computing device 601.

Communications module 609 may include a microphone, keypad, touch screen, and/or stylus through which a user of intelligent routing and dynamic learning computing device 601 may provide input, and may also include one or more of a speaker for providing audio output and a video display device for providing textual, audiovisual and/or graphical output. Computing system environment 600 may also include optical scanners (not shown).

Intelligent routing and dynamic learning computing device 601 may operate in a networked environment supporting connections to one or more other computing devices, such as computing device 641 and 651. Computing devices 641 and 651 may be personal computing devices or servers that include any or all of the elements described above relative to intelligent routing and dynamic learning computing device 601.

The network connections depicted in FIG. 6 may include Local Area Network (LAN) 625 and Wide Area Network (WAN) 629, as well as other networks. When used in a LAN networking environment, intelligent routing and dynamic learning computing device 601 may be connected to LAN 625 through a network interface or adapter in communications module 609. When used in a WAN networking environment, intelligent routing and dynamic learning computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
   receive, from a first communication session between a first computing device of user and a second computing device of an agent, audio data;
   extract, from the audio data, a topic of the first communication session;
   extract, from the audio data, metadata identifying parameters of the first communication session;
   compare the extracted topic of the communication session and the metadata identifying parameters of the first communication session to an alert signals database to output whether an alert will be attached to the first communication session;
   identify agent parameters associated with the agent;
   execute a routing determination machine learning model, wherein executing the routing determination machine learning model includes inputting, to the routing determination machine learning model, the extracted topic of the first communication session, the extracted metadata identifying parameters of the first communication session, the output of whether the alert will be attached to the first communication session, and the agent parameters to output a routing signal; and based on the routing signal, initiate a second communication session between at least the second computing device of the agent and a third computing device of at least one of: another agent or a supervisor.

2. The computing platform of claim 1, wherein initiating the second communication session is performed automatically based on the output routing signal.

3. The computing platform of claim 1, wherein initiating the second communication session includes initiating the second communication session between the first computing device of the user, the second computing device of the agent, and the third computing device of the at least one of: another agent or the supervisor.

4. The computing platform of claim 1, wherein initiating the second communication session includes joining the third computing device of the at least one of: another agent or the supervisor to the first communication session between the first computing device of the user and the second computing device of the agent.

5. The computing platform of claim 1, wherein initiating the second communication session includes initiating an online chat between the second computing device of the agent and the third computing device of the at least one of: another agent or the supervisor.

6. The computing platform of claim 1, wherein the parameters of the first communication session include one or more of: an amount of silent time in the audio data, word polarity in the audio data, a reference to a previous communication session in the audio data, or a duration of the first communication session.

7. The computing platform of claim 1, wherein the agent parameters include an agent score determined based on identified skills of the agent and previous communication sessions handled by the agent.

8. A method, comprising:
receiving, by a computing platform, the computing platform having at least one processor and memory, and from a first communication session between a first computing device of user and a second computing device of an agent, audio data;
extracting, by the at least one processor and from the audio data, a topic of the first communication session;
extracting, by the at least one processor and from the audio data, metadata identifying parameters of the first communication session;
comparing, by the at least one processor, the extracted topic of the first communication session and the metadata identifying parameters of the first communication session to an alert signals database to output whether an alert will be attached to the first communication session;
identifying, by the at least one processor, agent parameters associated with the agent;
executing, by the at least one processor, a routing determination machine learning model, wherein executing the routing determination machine learning model includes inputting, to the routing determination machine learning model, the extracted topic of the first communication session, the extracted metadata identifying parameters of the first communication session, the output of whether the alert will be attached to the first communication session, and the agent parameters to output a routing signal; and
based on the routing signal, initiating, by the at least one processor, a second communication session between at least the second computing device of the agent and a third computing device of at least one of: another agent or a supervisor.

9. The method of claim 8, wherein initiating the second communication session is performed automatically based on the output routing signal.

10. The method of claim 8, wherein initiating the second communication session includes initiating the second communication session between the first computing device of the user, the second computing device of the agent, and the third computing device of the at least one of: another agent or the supervisor.

11. The method of claim 8, wherein initiating the second communication session includes joining the third computing device of the at least one of: another agent or the supervisor to the first communication session between the first computing device of the user and the second computing device of the agent.

12. The method of claim 8, wherein initiating the second communication session includes initiating an online chat between the second computing device of the agent and the third computing device of the at least one of: another agent or the supervisor.

13. The method of claim 8, wherein the parameters of the first communication session include one or more of: an amount of silent time in the audio data, word polarity in the audio data, a reference to a previous communication session in the audio data, or a duration of the first communication session.

14. The method of claim 8, wherein the agent parameters include an agent score determined based on identified skills of the agent and previous communication sessions handled by the agent.

15. One or more non-transitory computer-readable media storing instructions that, when executed by a computing platform comprising at least one processor, memory, and a communication interface, cause the computing platform to:
receive, from a first communication session between a first computing device of user and a second computing device of an agent, audio data;
extract, from the audio data, a topic of the first communication session;
extract, from the audio data, metadata identifying parameters of the first communication session;
compare, the extracted topic of the first communication session and the metadata identifying parameters of the first communication session to an alert signals database to output whether an alert will be attached to the first communication session;
identify agent parameters associated with the agent;
execute a routing determination machine learning model, wherein executing the routing determination machine learning model includes inputting, to the routing determination machine learning model, the extracted topic of the first communication session, the extracted metadata identifying parameters of the first communication session, the output of whether the alert will be attached to the first communication session, and the agent parameters to output a routing signal; and
based on the routing signal, initiate a second communication session between at least the second computing device of the agent and a third computing device of at least one of: another agent or a supervisor.

16. The one or more non-transitory computer-readable media of claim 15, wherein initiating the second communication session is performed automatically based on the output routing signal.

17. The one or more non-transitory computer-readable media of claim 15, wherein initiating the second communication session includes initiating the second communication session between the first computing device of the user, the second computing device of the agent, and the third computing device of the at least one of: another agent or the supervisor.

18. The one or more non-transitory computer-readable media of claim 15, wherein initiating the second communication session includes joining the third computing device of the at least one of: another agent or the supervisor to the first communication session between the first computing device of the user and the second computing device of the agent.

19. The one or more non-transitory computer-readable media of claim 15, wherein initiating the second communication session includes initiating an online chat between the second computing device of the agent and the third computing device of the at least one of: another agent or the supervisor.

20. The one or more non-transitory computer-readable media of claim 15, wherein the parameters of the first communication session include one or more of: an amount of silent time in the audio data, word polarity in the audio data, a reference to a previous communication session in the audio data, or a duration of the first communication session.

* * * * *